United States Patent
Malik et al.

(10) Patent No.: US 10,657,251 B1
(45) Date of Patent: *May 19, 2020

(54) MULTISTAGE SYSTEM AND METHOD FOR ANALYZING OBFUSCATED CONTENT FOR MALWARE

(71) Applicant: FireEye, Inc., Milpitas, CA (US)

(72) Inventors: Amit Malik, Bangalore (IN); Shivani Deshpande, Fremont, CA (US); Abhishek Singh, Milpitas, CA (US); Wei Zheng, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,058

(22) Filed: Jun. 26, 2017

Related U.S. Application Data

(63) Continuation of application No. 14/321,636, filed on Jul. 1, 2014, now Pat. No. 9,690,936, which is a
(Continued)

(51) Int. Cl.
*G06F 21/56* (2013.01)

(52) U.S. Cl.
CPC .................................. *G06F 21/562* (2013.01)

(58) Field of Classification Search
CPC ...... G06F 21/562; G06F 21/557; G06F 21/62; G06F 21/6263; H04L 63/145; H04L 63/1408

See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Schmitt et al. PDF Scrutinizer: Detecting JavaScript-based Attacks in PDF Documents, IEEE 2012 (Year: 2012).*

(Continued)

*Primary Examiner* — Kambiz Zand
*Assistant Examiner* — Shu Chun Gao
(74) *Attorney, Agent, or Firm* — Rutan & Tucker, LLP

(57) ABSTRACT

A malware detection system configured to detect suspiciousness in obfuscated content. A multi-stage static detection logic is utilized to detect obfuscation, make the obfuscated content accessible, identify suspiciousness in the accessible content and filter non-suspicious non-obfuscated content from further analysis. The multi-stage static detection logic includes a controller, a de-constructor, and a post-processor. The controller is configured to receive content while the de-constructor configured to receive content from the controller and deconstruct the content using the analysis technique selected by the controller. The post-processor is configured to receive the de-constructed content from the de-constructor, determine whether a specimen within the de-constructed content is suspicious, and remove non-suspicious content from further analysis.

20 Claims, 4 Drawing Sheets

Related U.S. Application Data continuation-in-part of application No. 14/042,505, filed on Sep. 30, 2013, now Pat. No. 10,192,052.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,409,718 B1 * | 8/2008 | Hong ............ G06F 21/566 726/24 |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,475,427 B2 | 1/2009 | Palliyil et al. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,245 B2 * | 6/2012 | Dewey ............ G06F 21/56 726/22 |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |

(56) References Cited

U.S. PATENT DOCUMENTS

| | | | |
|---|---|---|---|
| 8,321,941 B2 | 11/2012 | Tuvell et al. | |
| 8,321,942 B1 | 11/2012 | Chiueh et al. | |
| 8,332,571 B2 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,424,090 B2* | 4/2013 | Kang | G06F 21/53 713/188 |
| 8,443,442 B2* | 5/2013 | Wang | H04L 63/1441 709/226 |
| 8,464,340 B2 | 6/2013 | Ahn et al. | |
| 8,479,174 B2 | 7/2013 | Chiriac | |
| 8,479,276 B1 | 7/2013 | Vaystikh et al. | |
| 8,479,291 B1 | 7/2013 | Bodke | |
| 8,495,733 B1 | 7/2013 | Cheng et al. | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shifter et al. | |
| 8,566,946 B1 | 10/2013 | Aziz et al. | |
| 8,578,166 B2* | 11/2013 | De Monseignat | H04L 63/0823 713/175 |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,763,103 B2 | 6/2014 | Locasto et al. | |
| 8,763,125 B1 | 6/2014 | Feng | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,829 B2 | 9/2014 | Manni et al. | |
| 8,832,836 B2 | 9/2014 | Thomas et al. | |
| 8,844,036 B2* | 9/2014 | Saidi | G06F 21/6218 726/23 |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,271 B2 | 11/2014 | Butler, II | |
| 8,881,278 B2 | 11/2014 | Kaplan et al. | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shifter et al. | |
| 8,959,639 B2 | 2/2015 | Shevchenko | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,125 B2 | 5/2015 | Kumar et al. | |
| 9,027,135 B1 | 5/2015 | Aziz | |
| 9,027,140 B1* | 5/2015 | Watkins | G06Q 30/0277 709/219 |
| 9,032,526 B2* | 5/2015 | Wang | G06F 9/455 726/24 |
| 9,071,638 B1 | 6/2015 | Aziz et al. | |
| 9,087,195 B2 | 7/2015 | Golovkin | |
| 9,092,616 B2* | 7/2015 | Kumar | G06F 21/52 |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,178,908 B2* | 11/2015 | Call | H04L 63/0471 |
| 9,189,627 B1 | 11/2015 | Islam | |
| 9,195,829 B1 | 11/2015 | Goradia et al. | |
| 9,197,664 B1 | 11/2015 | Aziz et al. | |
| 9,213,838 B2 | 12/2015 | Lu | |
| 9,223,972 B1 | 12/2015 | Vincent et al. | |
| 9,225,737 B2* | 12/2015 | Call | H04L 63/1425 |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,317,679 B1* | 4/2016 | Bhatkar | G06F 21/57 |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |
| 9,633,134 B2 | 4/2017 | Ross | |
| 9,635,039 B1 | 4/2017 | Islam et al. | |
| 9,641,546 B1 | 5/2017 | Manni et al. | |
| 9,654,485 B1 | 5/2017 | Neumann | |

(56) References Cited

U.S. PATENT DOCUMENTS

| | | |
|---|---|---|
| 9,661,009 B1 | 5/2017 | Karandikar et al. |
| 9,661,018 B1 | 5/2017 | Aziz |
| 9,672,355 B2 | 6/2017 | Titonis et al. |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 9,979,726 B2* | 5/2018 | Freitas FOrtuna dos Santos ........ H04L 63/1466 |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0061502 A1* | 3/2003 | Teblyashkin .......... G06F 21/563 726/24 |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |

(56) References Cited

U.S. PATENT DOCUMENTS

| | | |
|---|---|---|
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0209074 A1* | 9/2007 | Coffman ............... G06F 21/552 726/23 |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0261112 A1 | 11/2007 | Todd et al. |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0022407 A1 | 1/2008 | Repasi et al. |
| 2008/0028463 A1 | 1/2008 | Dagon et al. |
| 2008/0028469 A1* | 1/2008 | Repasi ............... G06F 21/554 726/24 |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0086775 A1* | 4/2008 | Repasi ............... G06F 21/55 726/24 |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0064369 A1* | 3/2010 | Stolfo ............... G06F 21/56 726/24 |
| 2010/0077481 A1 | 3/2010 | Polyakov et al. |
| 2010/0083376 A1 | 4/2010 | Pereira et al. |
| 2010/0115619 A1 | 5/2010 | Burtscher |
| 2010/0115621 A1 | 5/2010 | Staniford et al. |

(56) References Cited

U.S. PATENT DOCUMENTS

| | | |
|---|---|---|
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0250497 A1 | 9/2010 | Redlich et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0010697 A1* | 1/2011 | Golovkin ............ G06F 21/563 717/155 |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110174 A1 | 5/2012 | Wootton et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1* | 10/2012 | Dube ............ G06F 21/564 726/24 |
| 2012/0266244 A1* | 10/2012 | Green ............ G06F 21/566 726/24 |
| 2012/0278886 A1 | 11/2012 | Luna |
| 2012/0290848 A1* | 11/2012 | Wang ............ G06F 21/566 713/188 |
| 2012/0297489 A1 | 11/2012 | Dequevy |
| 2012/0304244 A1 | 11/2012 | Xie et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0091543 A1* | 4/2013 | Wade ............ G06F 21/54 726/1 |
| 2013/0091571 A1* | 4/2013 | Lu ............ G06F 21/563 726/23 |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117848 A1 | 5/2013 | Golshan et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227636 A1 | 8/2013 | Bettini et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0347104 A1 | 12/2013 | Raber et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0181973 A1* | 6/2014 | Lee ............ G06F 21/562 726/23 |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186296 A1* | 7/2015 | Guidry ............ G06F 21/54 713/193 |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |

(56) References Cited

U.S. PATENT DOCUMENTS

| | | | |
|---|---|---|---|
| 2015/0244733 A1* | 8/2015 | Mohaisen | H04L 63/1425 |
| | | | 726/23 |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0261612 A1 | 9/2016 | Mesdaq et al. | |
| 2016/0285914 A1 | 9/2016 | Singh et al. | |
| 2016/0301703 A1 | 10/2016 | Aziz | |
| 2016/0335110 A1 | 11/2016 | Paithane et al. | |
| 2017/0032120 A1* | 2/2017 | Tolpin | G06F 21/53 |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddigui et al. | |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Margolis, P.E. , "Random House Webster's 'Computer & Internet Dictionary 3rd Edition'", ISBN 0375703519, (Dec. 1998).

Moore, D. , et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt , "SandboxII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J. , et al., "Polygraph: Automatically Generating Signatures for Polymorphic Worms", In Proceedings of the IEEE Symposium on Security and Privacy, (May 2005).

Nojiri, D. , et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.—N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S. , et al., "Automated Worm Fingerprinting", Proceedings of the ACM/USENIX Symposium on Operating System Design and Implementation, San Francisco, California, (Dec. 2004).

Spitzner, Lance , "Honeypots: Tracking Hackers", ("Spizner"), (Sep. 17, 2002).

The Sniffers's Guide to Raw Traffic available at: yuba.stanford.edu/.about.casado/pcap/section1.html, (Jan. 6, 2014).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 14/042,505, filed Sep. 30, 2013 Non-Final Office Action dated Aug. 29, 2017.

U.S. Appl. No. 14/042,505, filed Sep. 30, 2013 Final Office Action dated Jul. 31, 2015.

U.S. Appl. No. 14/042,505, filed Sep. 30, 2013 Non-Final Office Action dated Feb. 24, 2015.

U.S. Appl. No. 14/321,636, filed Jul. 1, 2014 Final Office Action dated May 12, 2016.

U.S. Appl. No. 14/321,636, filed Jul. 1, 2014 Non-Final Office Action dated Sep. 15, 2015.

U.S. Appl. No. 14/321,636, filed Jul. 1, 2014 Non-Final Office Action dated Sep. 21, 2016.

U.S. Appl. No. 14/321,636, filed Jul. 1, 2014 Notice of Allowance dated Apr. 3, 2017.

U.S. Pat. No. 8,171,553 filed Apr. 20, 2006, Inter Parties Review Decision dated Jul. 10, 2015.

U.S. Pat. No. 8,291,499 filed Mar. 16, 2012, Inter Parties Review Decision dated Jul. 10, 2015.

Venezia, Paul , "NetDetector Captures Intrusions", InfoWorld Issue 27, ("Venezia"), (Jul. 14, 2003).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 pages.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

AltaVista Advanced Search Results. "attack vector identifier". Http://www.altavista.com/web/results?Itag=ody&pg=aq&aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

(56) References Cited

OTHER PUBLICATIONS

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Deutsch, P., "Zlib compressed data format specification version 3.3" RFC 1950, (1996).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric, et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik, "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael, et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
"Mining Specification of Malicious Behavior"—Jha et al, UCSB, Sep. 2007 https://www.cs.ucsb.edu/.about.chris/research/doc/esec07.sub.--mining.pdf-.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
U.S. Appl. No. 14/042,505, filed Sep. 30, 2013 Advisory Action dated Jun. 22, 2018.
U.S. Appl. No. 14/042,505, filed Sep. 30, 2013 Final Office Action dated Apr. 5, 2018.
U.S. Appl. No. 14/042,505, filed Sep. 30, 2013 Interview Summary dated Jun. 22, 2018.
U.S. Appl. No. 14/042,505, filed Sep. 30, 2013 Notice of Allowance dated Sep. 12, 2018.

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

* cited by examiner

MULTISTAGE SYSTEM AND METHOD FOR ANALYZING OBFUSCATED CONTENT FOR MALWARE

CROSS REFERENCE TO RELATED APPLICATION

This application is a continuation of U.S. application Ser. No. 14/042,505 filed Jul. 1, 2014, now U.S. Pat. No. 9,690,936 issued Jun. 27, 2017, which is a continuation-in-part of U.S. application Ser. No. 14/042,505 filed Sep. 30, 2013. The disclosure therein is incorporated by reference.

FIELD OF INVENTION

The present invention relates generally to computing systems, and more particularly to systems and methods of detecting and classifying malicious content.

GENERAL BACKGROUND

Over the last decade, malicious software (malware) has become a pervasive problem for Internet users. In some situations, malware is an exploit, in the form of a program or other object, which is embedded within downloadable content and designed to adversely influence or attack normal operations of a computer. Examples of different types of exploits may include bots, computer viruses, worms, Trojan horses, spyware, adware, or any other programming that operates within an electronic device (e.g. computer, tablet, smartphone, server, router, wearable technology, or other types of electronics with data processing and network capability) without permission by the user or an administrator. In some situations, malware is obfuscated to hide the purpose of the malware, while in other situations, non-malicious software is obfuscated. For instance, software may be obfuscated for non-malicious purposes including reducing the size through compression or protecting against unauthorized access through encryption.

Obfuscation of malicious objects may increase false negatives when a malware detection system analyzes the objects. For instance, exploits that are located in an obfuscated object may be hidden from detection by the malware detection system. As an illustrative example, an exploit may be placed within an executable object whose contents have been obfuscated, and carried into an electronic device undetected by conventional malware detection software, such as anti-virus programs (e.g. an exploit inserted into an object's JavaScript and the contents obfuscated to hide malicious code patterns).

Known malware detection systems employing anti-virus scanning approaches are adequate for detecting malware in un-obfuscated content but often fail to detect malware in obfuscated content. This results in a high level of false negatives. Other known malware detection systems detect malicious objects in either obfuscated or not obfuscated content by executing the content in runtime environments often established by virtualization technology and isolated from production environments for security purposes, an approach which often avoids high levels of false negatives. Unfortunately, such systems typically require substantial computing resources to establish run-time (virtual) environments required to safely process the content for an adequate period of time to observe malicious behavior. Hence, it would be desirable to provide a malware analysis scheme capable of efficiently detecting malware in obfuscated content, while avoiding high levels of false positives and high computing resource demands.

BRIEF DESCRIPTION OF THE DRAWINGS

Embodiments of the disclosure are illustrated by way of example and not by way of limitation to the figures of the accompanying drawings. Like references in the figures indicate similar elements.

DETAILED EMBODIMENT

Figure 1:
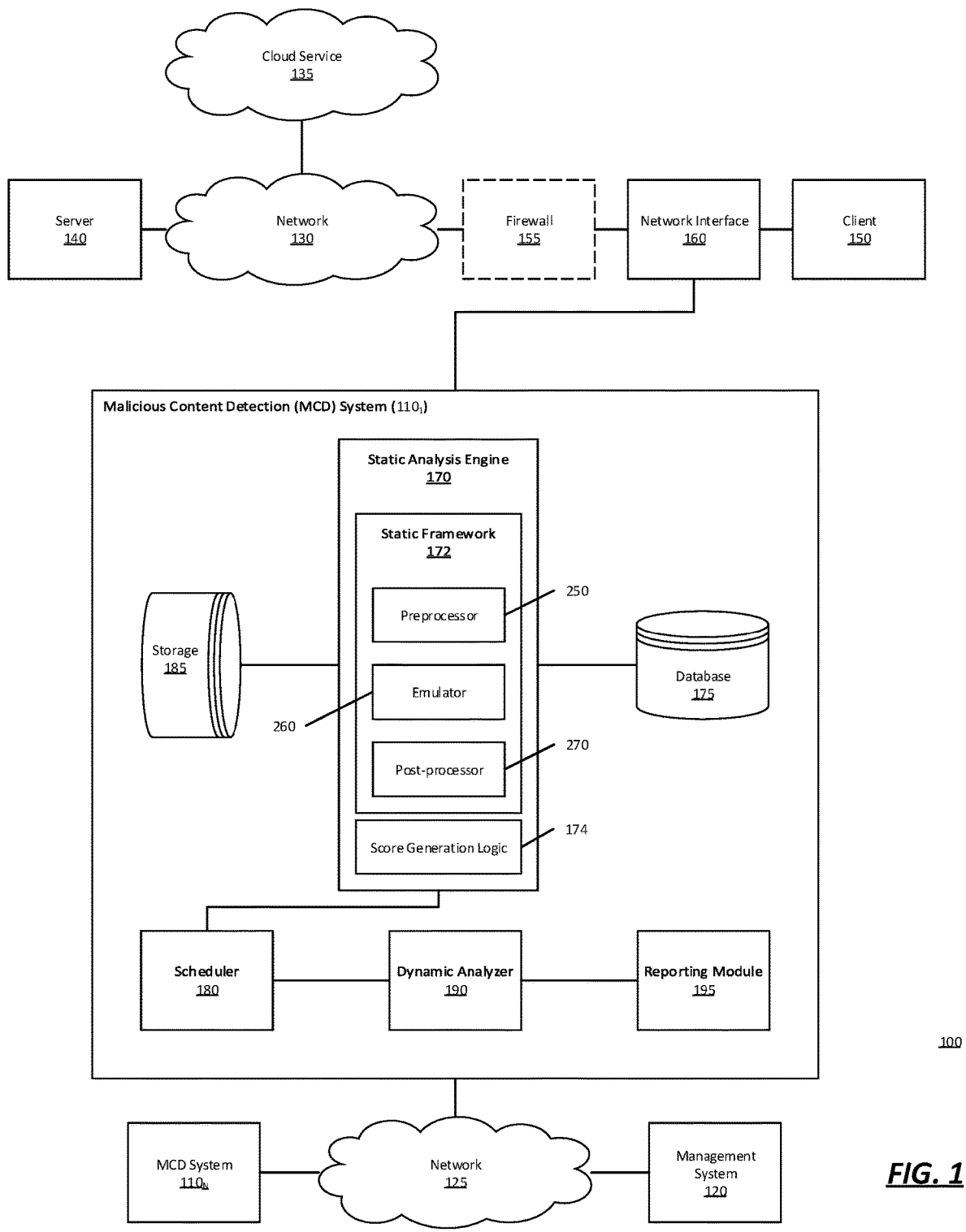
FIG. 1 is an exemplary block diagram illustrating a communication system implementing a plurality of malware detection (MCD) systems each having a multi-stage static analysis system in accordance with one embodiment.

Various embodiments of the disclosure provide a multi-stage malware analysis scheme that takes into account whether content is obfuscated in automatically analyzing that content for malware. Embodiments of the analysis scheme attempt to de-obfuscate such content using an emulator, and then statically analyze the de-obfuscated content for suspiciousness prior to processing only that content found to be suspicious in a dynamic analyzer. The dynamic analyzer processes the suspicious content in a virtual run-time environment (e.g., using one or more virtual machines configured with a software profile suitable for the type of content). In this way, embodiments of the invention provide efficient detection of malware embedded in obfuscated content, while avoiding high levels of false positives and high computing resource demands (e.g. CPU processing time, temporary memory space, network bandwidth, etc.).

In one embodiment, the multistage malware analysis scheme initially determines whether content is either suspicious or obfuscated using a preprocessor that statically analyzes the content. If determined to be suspicious and not obfuscated, the content is next analyzed using a dynamic analyzer. If determined to be obfuscated by the preprocessor, the content is de-obfuscated by an emulator into a form that may be statically analyzed using a post-processor. If the post-processor determines that the de-obfuscated content from the emulator is suspicious, the corresponding original obfuscated content whose de-obfuscated form was found to be suspicious is next analyzed using a dynamic analyzer. If the de-obfuscated form from the emulator is determined to be not suspicious by the post-processor, the content is filtered from further analysis and not analyzed by the dynamic analyzer.

In embodiments of the disclosure, a multistage malware detection system may include a preprocessor, an emulator, and one or more post-processors. The preprocessor receives content for static analysis, for example, from a network interface, and may include an obfuscation detector and suspiciousness determining logic. The obfuscation detector determines whether any objects in the content are obfuscated. The suspiciousness determining logic determines whether any objects in the content are suspicious in that they have one or more characteristics (e.g., attributes) associated with malware. In the emulator, the content provided by the obfuscation detector is emulated to produce a de-obfuscated form. The de-obfuscated content is further processed by one or more post-processors which determine the suspiciousness of the de-obfuscated content. Each post-processor includes suspiciousness determining logic. If suspiciousness as determined by the preprocessor or post-processor is below a threshold of suspiciousness, the content may be, in one embodiment, deemed benign and filtered from further analysis and not provided to the dynamic analyzer. If the suspiciousness from the post-processor is above the threshold, the content is scheduled for dynamic analysis.

In various embodiments, the suspiciousness determining logic of the preprocessor and post-processor may include one or more of (depending on the embodiment) an indicator match engine, a protocol anomaly checker, or heuristics engine (e.g. a rules checker, etc.). The preprocessor and post-processor may have the same component checkers and engines or different components. More specifically, the indicator match engine of the preprocessor determines suspiciousness based on matches of the content with a first set of indicators of suspiciousness stored in memory. The post-processor may have a second set of indicators of suspiciousness that is distinct from the first set malicious indicators used by the preprocessor or may utilize identical indicators. The protocol anomaly checker checks the content against applicable protocols (e.g., communication protocols) or industry standards (e.g. industry protocols) to determination suspiciousness based on deviations from the protocol(s). The heuristics engine performs a statistical analysis on the content to assess whether the content has (or characteristics of objects therein have) a statistical correlation with known malware. The rules checker determines whether detected characteristics of the content violate one or more rules such as, for example, access control rules or rules with respect to blacklisted or whitelisted addresses. The rules in some embodiments may be defined by a network or security administrator and entered via a suitable user interface. The rules are developed from past experience with detected malware and malware families.

In some embodiments, the preprocessor and post-processor can be combined into a single component which receives content from both the network interface and the emulator, and statically analyzes the content. In other embodiments, these components may be implemented as separate components, and even as separate electronic devices each including processing units which, for example, may be located within a single data center or may be located geographically distant from one another and connected by a communication link or a network (cloud).

In embodiments of the invention, processing and analysis of the suspicious content in the dynamic analyzer can be prioritized based on level of suspiciousness. The level of suspiciousness, depending on the embodiment, can be expressed as a score or weighting associated with a confidence level (e.g., probability) that the content is malicious. Accordingly, content queued for dynamic analysis and associated with a higher weight or score may be processed by the dynamic analyzer ahead of queued content with a lower weight or score. In some embodiments, both the preprocessor and post-processor include score generation logic for associating a score with each object constituting the original, un-obfuscated content analyzed by the preprocessor and with each object in the de-obfuscated form of the originally obfuscated content analyzed by the post-processor, respectively. In other embodiments, score generation logic can be interposed between the post-processor and the dynamic analyzer or within a dynamic analysis scheduler so as to generate a single weighting or score for all output from the preprocessor and post-processor.

More specifically, an embodiment of a preprocessor determines suspiciousness of content based on indicators of suspiciousness. The preprocessor conducts static analysis operations to identify characteristics of the content that may indicate malware by matching or finding a high correlation (above a threshold) with patterns of indicators associated with malware or families of malware. In some embodiments, the indicators of malware may be abstracted patterns of known malicious or benign content identifiers correlated to maliciousness (e.g. whitelist or blacklist of patterns). Herein, the static analysis operations are generally referred to as "malware checks". Content may be classified as "suspicious" by the preprocessor when one or more characteristics associated with malware are identified during static analysis operations conducted on the content indicate a probability that the content includes malware above a select threshold. This determination may be stored as a first suspiciousness score. Obfuscation (e.g. compression, encryption, etc.) of the content may itself be an indicator of suspiciousness. If the suspiciousness assigned to the content after preprocessing is below the threshold, the content will be filtered from further analysis and not presented for dynamic analysis. If the suspiciousness content after preprocessing is above the threshold, the content will be further processed. Obfuscated content will be provided by the preprocessor to the emulator, and un-obfuscated content will be provided by the preprocessor to the dynamic analyzer.

An embodiment of an emulator will process (e.g., simulate execution of) the obfuscated content provided by the preprocessor to produce a de-obfuscated representation of the obfuscated content. The emulator is configured to emulate the operations associated with the processing of the content in the context of an emulated computer application. As an optional feature, emulation logic may process a pre-determined list of functions of an application, which, in some embodiments, can be selectively modified by an IT or security administrator. In particular, the emulator intercepts (or "hooks") function calls, events and messages (e.g., API calls via specific application specific interfaces) and, in response sends values appropriate to the content and context of the emulation as inputs to the emulator (e.g. timing events, keyboard events, etc.). The de-obfuscated representation of the network content produced by the emulation logic will be processed by the post-processor. The information exchanged during the "hooking" operations as well as output data from the content under analysis are provided to the post-processor where they are statically analyzed for malware characteristics or indicators.

In an embodiment of the post-processor, the de-obfuscated representation produced by the emulator is processed and suspiciousness is determined, as noted above, based on a second set of indicators of suspiciousness. The second set of indicators of suspiciousness may be identical to the first set of indicators of suspiciousness or may have indicators peculiar to the de-obfuscated representation of the content. The second suspiciousness determination may lead to and may be stored as a second suspiciousness score. In an embodiment of the disclosure, if the suspiciousness determined for the de-obfuscated representation of the content by the post-processor is below a threshold of suspiciousness, the content may be filtered from further analysis. In an embodiment of the disclosure, the second threshold for suspiciousness may be identical to the first threshold for suspiciousness. In an alternative embodiment of the disclosure the second threshold for suspiciousness may be different from the first threshold for suspiciousness. If the suspiciousness determined for the de-obfuscated content is above the threshold of suspiciousness, the content is scheduled, in a scheduler, to be analyzed by a dynamic analyzer.

In an embodiment of the scheduler, the suspiciousness score(s) generated in the preprocessor and post-processor is used to determine a level of priority associated with corresponding content for use in scheduling the content for analysis by the dynamic analyzer. The scheduler may use for these purposes, depending on the embodiment, the first suspiciousness score assigned to the obfuscated content, the second suspiciousness score assigned to the de-obfuscated content, both suspiciousness scores, the individual indicators of suspiciousness used by the preprocessor and post-processor to determine the priority, or a combination of one or more of the foregoing. The level of priority is determined in the scheduler by assigning a higher priority to content that is more suspicious.

According to yet another embodiment of the disclosure, a forensic malware detection method or system may receive content for analysis that has been identified in advance as having a high level of probability of containing malware, and may implement a multistage malware detection scheme in accordance with any of the above embodiments to confirm or verify the existence of malware in the content under analysis.

I. General Architecture

Referring to FIG. 1, an exemplary block diagram of a communication system 100 deploying a plurality of malware content detection (MCD) systems $110_1$-$110_N$ (N>1, e.g. N=3) communicatively coupled to a management system 120 via a network 125 is shown. In general, management system 120 is adapted to manage MCD systems $110_1$-$110_N$. For instance, management system 120 may be adapted to cause one or more malware identifiers, each of which being information representative of prior detected malware, to be shared among some or all of the MCD systems $110_1$-$110_N$ for use in malware checks. Such sharing may be conducted automatically or manually uploaded by an administrator. Also, such sharing may be conducted freely among the MCD systems $110_1$-$110_N$ or subject to a subscription basis.

Herein, according to the embodiment illustrated in FIG. 1, a first MCD system $110_1$ is an electronic device that is adapted to analyze information associated with network traffic routed over a communication network 130 between at least one server device 140 and at least one client device 150. More specifically, the first MCD system $110_1$ is configured to conduct static analysis of information (e.g., an object that is part of message(s) transmitted via the network traffic) received via communication network 130 and, where applicable, classify the object with different "malicious" scores. An object may be classified with a first level (e.g. "suspicious"—assigned a score less than or equal to a first threshold) when at least one characteristic (or pattern of characteristics) identified during static analysis operations conducted on the object indicates a certain level of probability that the object includes malware. Similarly, the object may be classified with a second level (e.g. "malicious"—assigned a score greater than or equal to a second threshold greater than the first threshold) when at least one characteristic observed during static analysis operations conducted on the object indicates a certain greater level of probability that the object includes malware.

In an embodiment, static analysis is conducted by static analysis engine 170 within the first MCD system $110_1$. The static analysis engine 170 is configured to conduct a first static analysis operation on an object extracted from the network traffic to determine whether the object is suspicious in that it has a certain probability of being malicious. As part of that analysis the static analysis engine 170 determines whether the object contains obfuscated content. The static analysis engine 170 may determine that the object is obfuscated based on detecting, in the content, indicia signaling that the content has been compressed, encrypted or otherwise encoded. A determination that the content has been obfuscated can be used to increase the probability that it is suspicious and support a classification of maliciousness. If the object is found to not be suspicious (e.g. benign), no further analysis need be performed on the object. On the other hand if the object is found to be suspicious the static analysis engine 170 will provide the object to an emulator 260 to render the obfuscated code to de-obfuscated format. The emulator processes the obfuscated content into de-obfuscated form by "hooking" to the Application Programming Interfaces (APIs) calls from the content processed in an emulated application and substituting the appropriate values when functions are called during the processing of the content. The de-obfuscated content obtained after emulation is analyzed to determine if the content correlates with one or more malware characteristics. The level of correlation (e.g., exact pattern match, or for example, matching a majority of the pattern) may be "factory set" or may be adjustably set (e.g. by an administrator). In some embodiments an object of network content may have one or more embedded objects (e.g. sub-objects). The malware checks are conducted by the static analysis engine 170 on the one or more embedded objects within the object in order to potentially classify the overall object as "malicious," depending on whether any embedded object within the object is determined to have at least one characteristic associated with malware or whether the suspiciousness of the embedded objects in the aggregate is sufficient to determine whether the overall object requires further analysis.

The communication network 130 may include a public network such as the Internet, in which case an optional firewall 155 (represented by dashed lines) may be interposed between communication network 130 and client device 150. Alternatively, the communication network 130 may be a private computer network such as a wireless telecommunication network, wide area network, or local area network, or a combination of networks.

The first MCD system $110_1$ is shown as being coupled with the communication network 130 (behind the firewall 155) via a network interface 160. The network interface 160 operates as a data capturing device (referred to as a "tap" or "network tap") that is configured to receive data traffic propagating to/from the client device 150 and provide content from the data traffic to the first MCD system $110_1$.

In an embodiment, the network interface 160 receives and duplicates the content that is received from and provided to client device 150 normally without an appreciable decline in performance in the server device 140, the client device 150, or the communication network 130. The network interface 160 may duplicate any portion of the content, for example, one or more objects that are part of a data flow or part of the payload contained within certain data packets, or the like.

In some embodiments, the network interface 160 may capture metadata from network traffic intended for client device 150. This metadata may be used, at least in part, to de-obfuscate a corresponding file. For instance, the metadata may include one or more keys that can be used to de-obfuscate the file. The metadata may be advantageously used by the scheduler 180 to retrieve and configure a virtual machine (VM) to correspond to the pertinent features of the client device 150.

It is contemplated that, for any embodiments where the first MCD system $110_1$ is implemented as a dedicated appliance or a dedicated computer system, the network interface 160 may include an assembly integrated into the appliance or computer system that includes network ports, network interface card and related logic (not shown) for connecting to the communication network 130 to non-disruptively "tap" data traffic propagating through firewall 155 and provide a copy of the data traffic to the static analysis engine 170. In other embodiments, the network interface 160 can be integrated into an intermediary device in the communication path (e.g., firewall 155, router, switch or other network device) or can be a standalone component, such as an appropriate commercially available network tap. In virtual environments, a virtual tap (vTAP) can be used to duplicate objects from virtual networks.

Referring still to FIG. 1, first MCD system $110_1$ may include a static analysis engine 170, a database 175, a scheduler 180, a storage device 185, and a dynamic analyzer 190. In some embodiments, the network interface 160 may be contained within the first MCD system $110_1$. Also, static analysis engine 170, scheduler 180 and/or dynamic analyzer 190 may be software modules executed by one or more processors 200 that receive one or more objects within the content and perform a multi-stage static analysis on the objects, which may involve accessing one or more non-transitory storage mediums operating as database 175, storage device 185 and/or reporting module 195. In some embodiments, the static analysis engine 170 may be one or more software modules forming a static framework 172, where such software modules are executed by a processor 200. The scheduler 180 and the dynamic analyzer 190 may be one or more software modules executed by the same or a different processor, where these different processors are possibly located at geographically remote locations, located within the same processor package (e.g. different processor cores) and/or communicatively coupled for example via a network.

In general, the static analysis engine 170 performs static analysis on an object to determine whether it may include exploits, vulnerable functions, and/or malicious patterns. More specifically, as illustrated in FIG. 1, the static analysis engine 170 receives a duplicate copy of one or more objects associated with network traffic received from the network interface 160 and statically scans the content of the object(s) for malware identifiers. In other words, the static analysis engine 170 performs a first static analysis by comparing the contents of each object with known characteristics of malware, which may include finding correlations with characteristics associated with malware, to determine the existence of malware. Characteristics associated with malware may include exploit patterns, names of vulnerable functions, heap spray patterns, etc. Alternatively, in in-line deployments, the network interface 160 may provide the original (rather than a duplicate) of the portion of content to the static analysis engine 170 for malware analysis. While the balance of this specification may refer to the duplicate, this alternative embodiment may serve to implement the concepts later described herein.

If the comparison reveals a correlation between the contents of the object and one or more malware identifiers (hereinafter referred to as a "match"), which denotes a malicious event, the static analysis engine 170 determines whether the corresponding object is "suspicious" and assigns a score to the object. The malware checks applied by the static analysis engine 170 may be based on data and/or rules stored in the heuristics database 175.

Upon detecting a match, the score generation logic 174 may assign a score (e.g., an indicator of the likelihood of the analyzed object including malware) to the object analyzed with the static analysis engine 170. The score generation logic 174 will determine a score for the analyzed content using the results of the preprocessor 250 or post-processor 270. This may be performed in some embodiments by assigning a score to individual objects found in the content, and then mathematically combining the object-level scores to obtain an overall score for the content. Thereafter, the content and score are routed from the scanning engine to the dynamic analyzer 190 for use in further analysis to confirm the presence of malware within the content. The content may be scheduled for analysis in the dynamic analyzer 190 by a scheduler 180.

The static analysis engine 170 conducts emulation operations in an emulator 260, where the processing of an object is emulated and an output associated with such processing may be statically scanned to determine if portions of the output match any of the pre-stored malware identifiers. The emulator may be, for example, a "light weight" run-time environment. The run-time environment is described as "light weight" because it does not actually run applications that normally are used in processing objects. The run-time environment may be provided by an emulated application. For example, a JavaScript™ object may expect a browser application, and therefore, for emulation, the MCD system $110_1$ relies on an emulator to present certain simulated or virtualized features and system responses associated with that application as expected by the object being analyzed. The MCD system $110_1$ then monitors characteristics of the object within the emulator, for example, by intercepting or "hooking" function calls and comparing the hooked calls with those expected of similar objects when processed. Any unexpected function calls are regarded as anomalies that may indicate the object is malicious. The object is then assigned a score based on the presence or absence of such anomalies, and, in some embodiments, the type of the call or other characteristics of the observed anomalies.

After static analysis, the content may be presented to the dynamic analyzer 190 for more in-depth dynamic analysis using virtual machine technology for processing of the object in a more complete run-time environment in which one or more applications are executed (not just emulated). The ensuing processing may be conducted for a period of time that is either fixed or variable, and may be set manually by an administrator or automatically by the MCD system $110_1$, for example, based on the type of object, queue length of objects to be analyzed or other analysis parameters. For this purpose, the static analysis engine 170 communicates with the scheduler 180.

The scheduler 180 may retrieve and configure a virtual machine (VM) with appropriate computer software (e.g. operating system and applications) and features to correspond to the pertinent characteristics of a client device. In one example, the scheduler 180 may be adapted to configure the characteristics of the VM to correspond only to those features of the client device 150 that are affected by the data traffic copied by the network interface 160. The scheduler 180 may determine the features of the client device 150 that are affected by the content by receiving and analyzing the network traffic from the network interface 160. Such features of the client device 150 may include ports that are to receive the content, certain device drivers that are to respond to the content, and other devices coupled to or contained within the client device 150 that can respond to the content. In another embodiment of the disclosure, where the network content is processed forensically, the scheduler 180 will configure the VM to correspond to the features indicated by analyzing content received by the network interface 160. Content received by the network interface 160 may include metadata which may be analyzed to determine protocols, application types and other information that may be used to retrieve and configure the VM by the scheduler 180.

In another embodiment of the disclosure, the static analysis engine 170 may determine the features of the client device 150 that are affected by the network traffic by receiving and analyzing the content from the network interface 160. The static analysis engine 170 may then transmit the features of the client device to the scheduler 180 or dynamic analyzer 190.

The dynamic analyzer 190 is adapted to execute one or more VMs to simulate the receipt and/or execution of different "malicious" objects within content under analysis (analyzed content) within a run-time environment as expected by the type of object, as noted above. The run-time environment may be one selected to correspond to one that is appropriate to the content, or that is prevalently provided by client devices, or, in alternative embodiments, one that can be provided by the client device 150 in particular. Furthermore, the dynamic analyzer 190 analyzes the effects of such content upon the run-time environment, such as the client device 150. Such effects may include unusual network transmissions, unusual changes in performance, and the like. This detection process is referred to as dynamic malicious content detection.

The dynamic analyzer 190 may flag the malicious content as malware according to the observed behavior of the VM. The reporting module 195 may issue alerts indicating the presence of malware, and using pointers and other reference information to identify which content may contain malware. Additionally, the server device 140 may be added to a list of malicious network content providers, and future network transmissions originating from the server device 140 may be blocked from reaching their intended destinations, e.g., by firewall 155.

In an alternative embodiment of the disclosure the static framework 172, includes a controller, a deconstruction engine, and a post-processor. The controller receives the content to be analyzed and detects the type of the content. The controller determines, based on whether the controller can access the native code of the content, an analysis technique to be used by the deconstruction engine. The deconstruction engine may perform a variety of techniques to analyze the content received from the controller. If the controller determines that the content cannot access the native code of the content, the deconstruction engine will select an analysis technique that implements a de-compiler to access the native code of the content. The deconstruction process returns the native code (e.g. plain-text, etc.) as a deconstructed representation of the content. The deconstructed representation is processed in the post-processor 270 which receives the de-constructed content from the de-constructor. The post-processor determines if the de-constructed content matches any known malware characteristics. The malware characteristics may include malicious obfuscation such as, for example, functional obfuscation, using the frequency, n-gram, length of strings or numbers and size of decompiled files. Matches to the malware characteristics are indicators of suspiciousness and may amount to maliciousness. If these values exceed a certain threshold, the file is classified as malicious. Each component of the static framework 172 may be stored in persistent storage 230 and executed by the processors 200.

Of course, in lieu of or in addition to static analysis operations being conducted by MCD systems $110_1$-$110_N$, it is contemplated that cloud computing services 135 may be implemented to perform such static analysis: de-obfuscate content for static analysis, perform emulation of obfuscated content to render de-obfuscated content, and conduct static scans on one or more objects within the de-obfuscated content as described herein. In accordance with this embodiment, MCD system $110_1$ may be adapted to establish secured communications with cloud computing services 135 for exchanging information. The dynamic analysis may also be conducted in the cloud.

Figure 2:
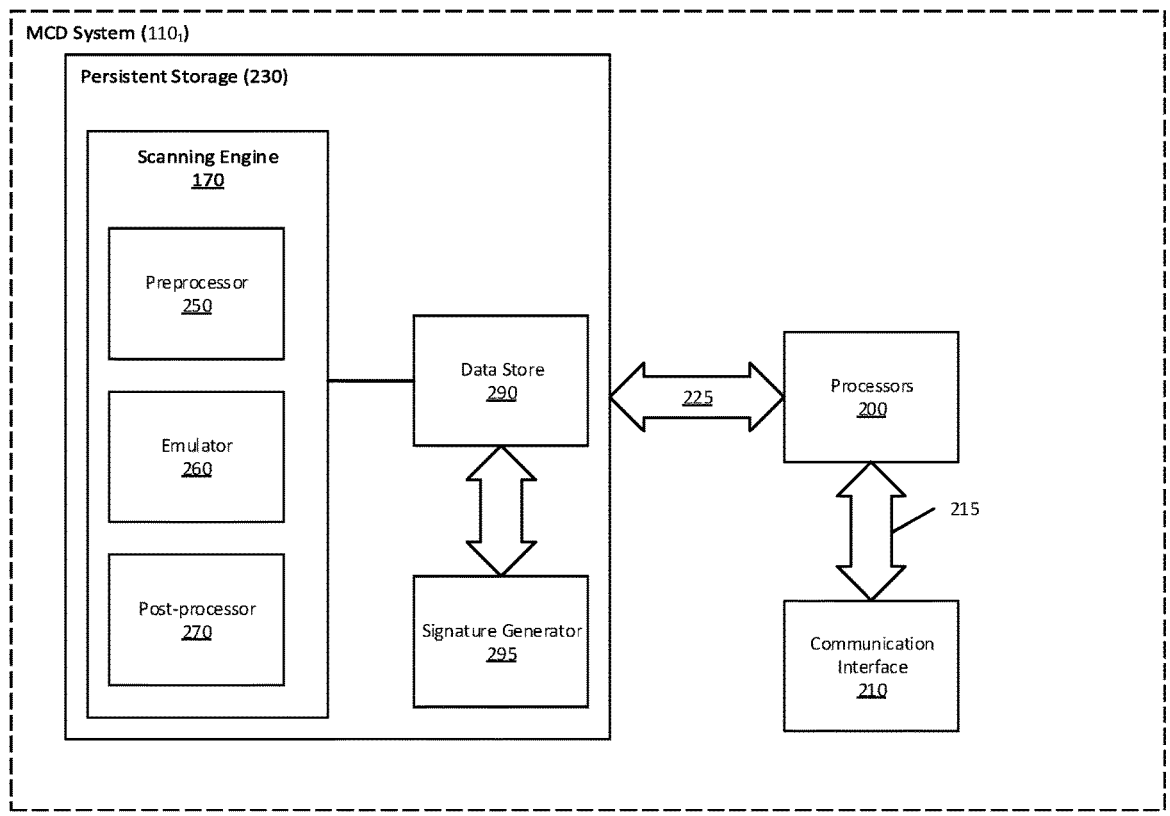
FIG. 2 is an exemplary block diagram of logic associated with one of the multi-stage static analysis systems of FIG. 1 in accordance with one embodiment.

Referring now to FIG. 2, a block flow diagram of logic associated with MCD system $110_1$ is shown. MCD system $110_1$ includes one or more processors 200 that are coupled to communication interface logic 210 via a first transmission medium 215. Communication interface logic 110 enables communications with other MCD systems $110_2$-$110_N$ and management system 120 of FIG. 1. According to one embodiment of the disclosure, communication interface logic 210 may be implemented as a physical interface including one or more ports for wired connectors. Additionally, or in the alternative, communication interface logic 210 may be implemented with one or more radio units for supporting wireless communications with other electronic devices.

Processor 200 is further coupled to persistent storage 230 via transmission medium 225. According to one embodiment of the disclosure, persistent storage 230 may include static analysis engine 170, which includes a preprocessing malware check logic 250, an emulation logic 260, and a post-processing malware check logic 270. Of course, when implemented as hardware, logic 250, 260 and/or 270 would be implemented separately from persistent storage 230.

Preprocessing malware check logic 250 includes one or more software modules to conduct static analysis of content within an object to determine whether such content includes characteristics of malware, such as information associated with known malware exploits. The preprocessing malware check logic 250 may conduct, in some embodiments, a malware signature matching operation. The term "signature" designates an indicator of a set of characteristics and/or behaviors exhibited by one or more exploits that may not be unique to those exploit(s). Thus, a match of the signature may indicate to some level of probability, often well less than 100%, that an object constitutes an exploit. In some contexts, those of skill in the art have used the term "signature" as a unique identifier or "fingerprint," for example, of a specific virus or virus family (or other exploit), which is generated for instance as a hash of its machine code, and that is a special sub-case for purposes of this disclosure. As an example, malware check logic 250 may be initially invoked to conduct static analysis of content in the object, which includes conducting pattern comparison operations (e.g. bitwise comparison, byte-wise comparison, etc.) between accessible object content and malware identifiers associated with known exploit patterns (e.g. heap spray, shell code, etc.) and vulnerable functions obtained from data store 290. Accessible object content is content that is not obfuscated; obfuscation is detected by the obfuscation detection logic 320. The data store 290 may store patterns correlated with characteristics and patterns of characteristics of known malicious content. The patterns stored in data store 290 may be generated in a signature generator 295. The patterns stored in data store 290 may be modified by an administrator remotely or locally. The correlation engine 310 may access the data store 290 for malware identifiers associated with known exploit patterns. When the preprocessing malware check logic 250 fails to have code-level access for a targeted object as a result of obfuscation within the object, it is processed by the emulation logic 260.

Emulation logic 260 (emulator) includes one or more software modules that are invoked when the preprocessing malware check logic 250 (preprocessor) fails to have code-level access for a targeted object within the analyzed object. Emulation logic 260 is configured to emulate operations of the object and, perhaps in combination with preprocessing malware check logic 250, monitor for anomalous characteristics. The monitoring may be accomplished by "hooking" certain functions associated with that object (e.g., application programing interface (API) function calls, etc.) as described above, and controlling what data is specifically returned in response to corresponding function calls (e.g., substituting function input values). After receipt of the returned data, operations by the object are monitored by the static analysis engine. For instance, the output from the object may be monitored and analyzed by the post-processing malware check logic 270 (post-processor) to determine if a portion of the output matches any malware characteristics. In some embodiments, the emulation logic 260 or the post-processing malware check logic 270 may access data store 290 for purposes of retrieving, from an API call repository, expected API calls typical of the type of content being processed, and may store "hooked" API calls therein for later reference.

Subsequently, after failing to detect any suspicious characteristics and emulating the object as described herein, the post-processing malware check logic 270 may conduct a secondary static analysis in which content within objects associated with the de-obfuscated object (e.g., code associated with one or more embedded objects within the object that is accessible after emulating the object) is compared to the malware identifiers.

Figure 3A:
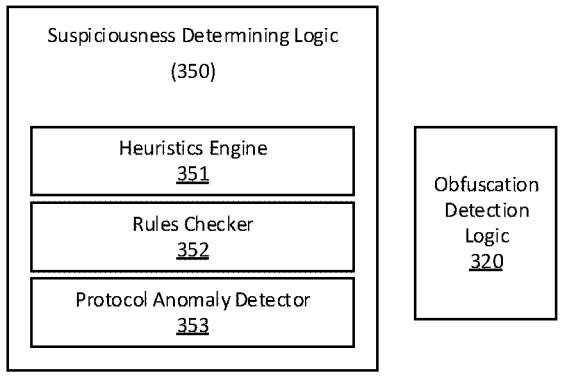
FIG. 3A is an exemplary block diagram of the preprocessor of FIG. 1 in accordance with one embodiment.

Referring to FIG. 3A, the preprocessing malware detection logic 250 (preprocessor) may include a suspiciousness determining logic 350. The suspiciousness determining logic 350 may further include a heuristics engine 351, a rules checker 352, and a protocol anomaly detector 353. The heuristics engine 351 identifies patterns correlating with malware in the content being analyzed. The correlations of the heuristics engine 351 are the result of statistical analyses and experiential knowledge pertaining to previously detected malware and malware families. The statistical analyses for the heuristics engine 351 may be conducted in the same preprocessor 250 or post-processor 270. The rules checker 352 would identify suspiciousness by associating compliance of the content analyzed with access control rules (e.g. blacklists, whitelists, etc.), that are defined by an administrator locally or defined by a remote malware-related service provider and downloaded for use. The protocol anomaly detector 353 associates suspiciousness with non-compliance with applicable protocols or applicable standards. Analyzed content's deviation from the corresponding protocol may be a characteristic associated with maliciousness. The obfuscation detection logic 320 determines if content is obfuscated through analysis of the content. Analysis in the obfuscation detection logic 320 may include extracting features at various representation levels (i.e. source code, lexical token, etc.).

Figure 3B:
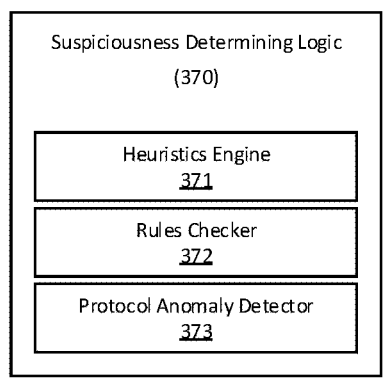
FIG. 3B is an exemplary block diagram of the post-processor of FIG. 1 in accordance with one embodiment.

Referring to FIG. 3B, the post-processing malware detection logic 270 (post-processor) includes a suspiciousness determining logic 370. The post-processing suspiciousness determining logic 370 components may be identical (as described above) preprocessing suspiciousness determining logic 350.

Figure 4:
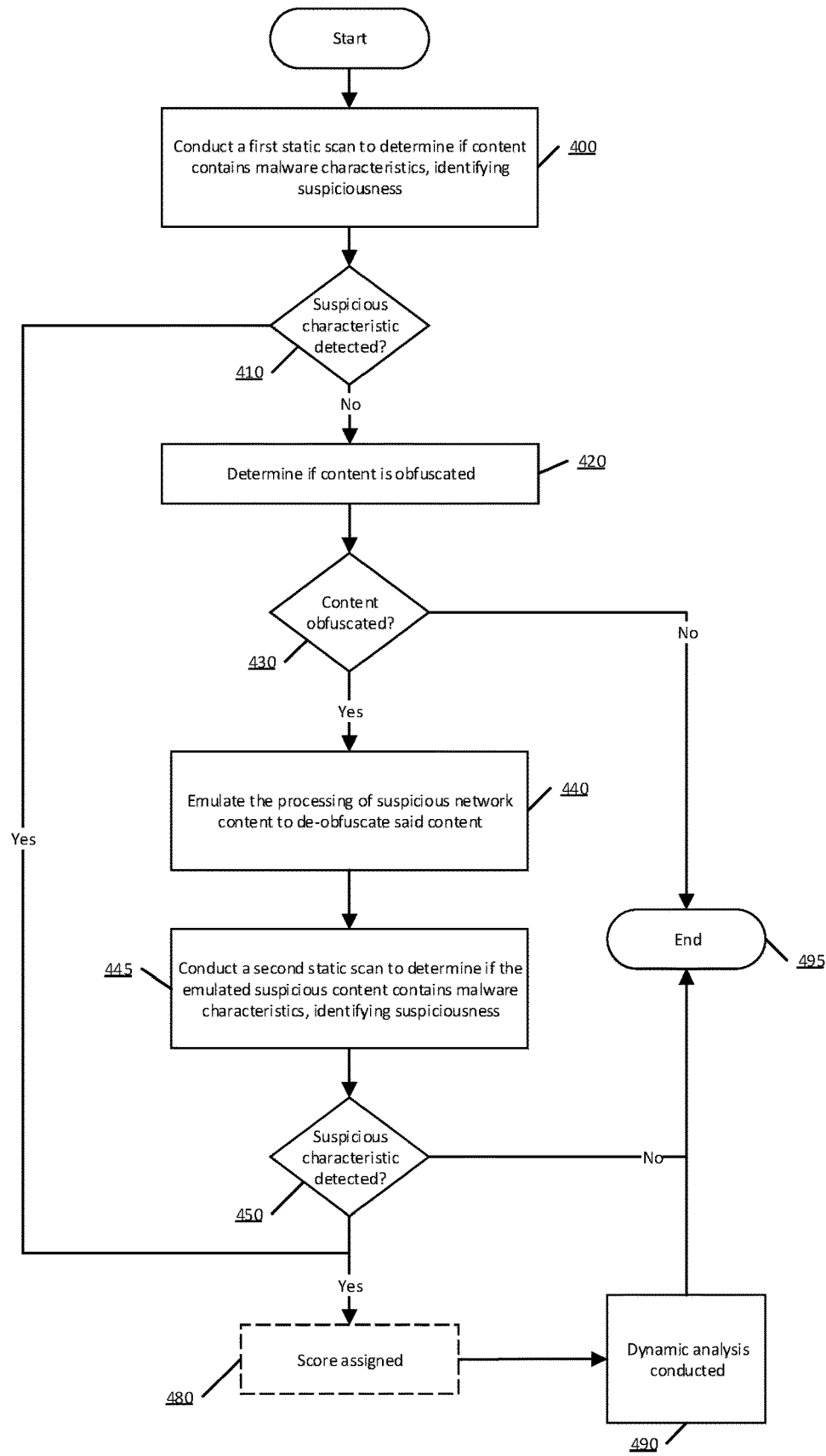
FIG. 4 is an exemplary block diagram of a flowchart illustrating a method of operation of a multi-stage static analysis system in accordance with one embodiment.

Referring to FIG. 4, an exemplary diagram of a flowchart illustrating a multi-stage static analysis of content (e.g., analyzed object) is shown. Herein, a first static analysis is conducted to determine if objects within analyzed content has a correlation with (generally referred to as "matches") known malware exploit patterns, vulnerable function calls, or malicious patterns (block 400). If a suspicious identifier is matched, it is contemplated that a score that identifies the likelihood of the presence of malware within the analyzed object may be produced and in some embodiments, provided for use in subsequent VM-based analysis of the object (blocks 480 and 490).

In the event that no suspicious characteristic is detected in the first stage, an analysis will be conducted to determine if the content is obfuscated (block 420). If the content analyzed is determined not to be obfuscated (block 430) the content is filtered from further analysis. In the event that the content is determined to be obfuscated (block 430), a second stage static analysis (block 445) is conducted after emulated processing of the object within the context of simulated operations associated with a targeted application (block 440). For example, the emulation simulates operations that may occur if a browser application were actually, or virtually, being executed. One reason for such emulation is to detect malware exploits that are executed only upon detecting a certain targeted application. If an identifier associated with malware is detected, a score that identifies the likelihood of the presence of malware within the analyzed object may be produced and provided for subsequent VM-based analysis of the content (blocks 450, 480 and 490) and in some embodiments, in classifying the content following such VM based analysis.

If the suspicious characteristic is detected and the object is not obfuscated, a determination is made as to whether further analysis is to be conducted within the VM-based dynamic analyzer (block 490). If no further static analysis is to be conducted and a determination is made to analyze the object in the VM-based analyzer, the analyzed object (or at least a portion of the analyzed object) is provided to dynamic analyzer 190 of FIG. 1 for VM-based analysis.

In the event the static analysis does not find a suspicious characteristic and the object is not obfuscated, the analysis will end. In an alternative embodiment the endpoint 495 is a virtual endpoint simulating a destination during a forensic analysis. A forensic analysis is one that analyzes content that is suspected to have caused malicious behavior on a device.

In general, one embodiment is directed to a multi-stage static analysis that filters non-suspicious objects from further analysis and emulates processing of the analyzed object with results of the same being provided to the dynamic analyzer 190 for subsequent VM-based analysis. This multi-stage static analysis is configured to improve accuracy and efficiency in malware analysis. As alternative embodiments, it is contemplated that any or all of the above-described static analyses may be conducted concurrently.

In some embodiments, based on a combination of the respective scores resulting from the static scans exceeding a threshold, the analyzed object may be classified as malicious, non-malicious, or, possibly, in need of further analysis, e.g., in VM-based analysis before classification may be made. It can be understood that, even if classified as a result of the static analysis, the object may be subjected to VM-based analysis to further identify characteristics and behaviors for use in later deterministic checks, for identifier comparison, for blocking, for remediation or for confirmation of static analysis results.

In the foregoing description, the invention is described with reference to specific exemplary embodiments thereof. It will, however, be evident that various modifications and changes may be made without departing from the broader scope of the invention as set forth in the claims.

What is claimed is:

1. A system for detecting malicious content, comprising:
   a hardware storage device;
   a first component stored within the hardware storage device, the first component to receive content and determine whether native code of the content is accessible;
   a de-constructor stored within the hardware storage device, the de-constructor to receive the content from the first component in response to the native code being inaccessible to the first component, the de-constructor to select an analysis technique that implements a de-compiler to access the native code and output a deconstructed representation of the received content; and
   a post-processor stored within the hardware storage device, the post-processor to receive the deconstructed representation of the received content from the de-constructor, determine whether the native code represented by the deconstructed representation of the received content is suspicious thereby indicating that at least a portion of the native code includes attributes associated with malware, establish a secure communication with a cloud computing service when the native code is determined to be suspicious or remove the native code from further analysis when the native code is determined to be non-suspicious, and provide at least the suspicious native code to the cloud computing service to perform a dynamic analysis of the native code by processing the native code within one or more virtual machines configured with a software profile suitable for the processing of the native code and analysis of an observed behavior of the one or more virtual machines.

2. The system of claim 1, wherein the first component being a controller configured to select the analysis technique when the controller cannot access the native code associated with the received content.

3. The system of claim 2, wherein the controller selects the analysis technique from a plurality of analysis techniques, including the de-compiler, when the controller cannot access the native code associated with the received content.

4. The system of claim 1, wherein the post-processor determines suspiciousness of the received content by establishing a correlation with a set of indicators of suspiciousness and the dynamic analysis of the native code is conducted by processing the native code within the one or more virtual machines and the analysis of one or more observed behaviors of the one or more virtual machines or the native code.

5. The system of claim 2, wherein the controller, the de-constructor and the post-processor are performed by the cloud computing service to receive the content over a network.

6. The system of claim 2, wherein the controller selects the analysis technique based on the file type.

7. The system of claim 4, wherein the set of indicators includes known malware characteristics including a number or size of decompiled files.

8. A system for detecting malicious content, comprising:
   one or more processors;
   a communication interface communicatively coupled to the one or more processors; and
   a persistent hardware storage communicatively coupled to the one or more processors, the persistent hardware storage storing
   a controller to receive content via the communication interface and determine whether native code associated with the received content is accessible,
   a deconstruction engine to receive as input the received content from the controller, select an analysis technique that includes selection of a logic component to access the native code being inaccessible by the controller by at least deconstructing the received content according to the analysis technique selected by the controller to produce de-constructed content using the logic component, wherein the de-constructed content includes native code of the received content, and
   a post-processor to receive the de-constructed content from the deconstruction engine, determine whether a specimen associated with the received de-constructed content is suspicious based on an analysis of the received de-constructed content, remove non-suspicious content within the received de-constructed content from further analysis, and provide the suspicious content of the received de-constructed content for behavioral analysis of the suspicious content.

9. The system of claim 8, wherein the logic component includes a de-compiler when the controller cannot access the native code of the received content.

10. The system of claim 8, wherein the logic component comprises an emulator, and the controller selects the analysis technique that uses the emulator when the controller determines that received content is obfuscated.

11. The system of claim 8, wherein the controller selects the analysis technique based on a file type of the received content.

12. The system of claim 8, wherein the post-processor of the persistent hardware storage determines a level suspiciousness of the de-constructed content by establishing a correlation with a set of indicators of suspiciousness.

13. The system of claim 8, wherein the deconstruction engine is configured to receive the content in response to the controller being unable to access native code of the content.

14. The system of claim 8, wherein the post-processor determines whether the specimen is suspicious based on the analysis of the received de-constructed content by at least comparing the received de-constructed content with known malware characteristics.

15. The system of claim 8, wherein the controller, the deconstruction engine and the post-processor are performed by a cloud computing service receiving the content over a network.

16. The system of claim 8, wherein the post-processor of the persistent hardware storage provides the suspicious content of the received de-constructed content to a dynamic analyzer deployed as part of a cloud computing service.

17. The system of claim 16, wherein the post-processor of the persistent hardware storage provides the suspicious content to the dynamic analyzer that includes one or more virtual machines configured with a software profile suitable for the processing of the native code.

18. A non-transitory computer readable medium including software that, upon execution by a hardware processor, performs operations to detect whether received content is malicious, the software comprising:

a first module that, upon execution by the hardware processor, is configured to receive content via the communication interface and determine whether native code associated with the received content is accessible;

a deconstruction engine that, upon execution by the hardware processor, select an analysis technique that includes selection of a logic component to recover de-obfuscated content in response to the native code being inaccessible by the first component by at least deconstructing the received content according to the analysis technique selected by the first module to produce the de-constructed content using the logic component; and a post-processor that, upon execution by the hardware processor, determines whether a specimen associated with the de-constructed content is suspicious based on an analysis of the de-constructed content, remove non-suspicious content within the de-constructed content from further analysis, and provide the suspicious content of the de-constructed content for behavioral analysis.

19. The non-transitory computer readable medium of claim 18, wherein the logic component includes one of a de-compiler or an emulator.

20. The non-transitory computer readable medium of claim 19, wherein the first module selects the analysis technique that includes the de-compiler when the first module cannot access the native code of the received content.

* * * * *